US008991706B2

(12) United States Patent
Green

(10) Patent No.: US 8,991,706 B2
(45) Date of Patent: Mar. 31, 2015

(54) SECURITY ELEMENT FOR DOCUMENT OF VALUE

(75) Inventor: Stephen Banister Green, Southampton (GB)

(73) Assignee: De la Rue International Limited, Hampshire (GB)

( * ) Notice: Subject to any disclaimer, the term of this patent is extended or adjusted under 35 U.S.C. 154(b) by 20 days.

(21) Appl. No.: 13/574,862

(22) PCT Filed: Feb. 9, 2011

(86) PCT No.: PCT/GB2011/050230
§ 371 (c)(1),
(2), (4) Date: Oct. 19, 2012

(87) PCT Pub. No.: WO2011/098803
PCT Pub. Date: Aug. 18, 2011

(65) Prior Publication Data

US 2013/0043311 A1 Feb. 21, 2013

(30) Foreign Application Priority Data

Feb. 10, 2010 (GB) .................................. 1002260.6

(51) Int. Cl.
*G06K 7/00* (2006.01)
*G06K 7/10* (2006.01)
(Continued)

(52) U.S. Cl.
CPC .......... *G07D 7/0006* (2013.01); *B42D 2033/22* (2013.01); *B42D 2035/36* (2013.01);
(Continued)

(58) Field of Classification Search
CPC .................................................. B42D 2033/22
USPC ................... 235/458, 454, 439, 435; 358/1.9
See application file for complete search history.

(56) References Cited

U.S. PATENT DOCUMENTS 5,447,335 A * 9/1995 Haslop ........................... 283/91
2006/0006236 A1* 1/2006 Von Fellenberg et al. .... 235/458
(Continued)

FOREIGN PATENT DOCUMENTS

DE 36 28 353 A1 2/1988
FR 2 843 072 A1 2/2004
(Continued)

OTHER PUBLICATIONS

International Search Report issued in International Patent Application No. PCT/GB2011/050230 dated Jun. 7, 2011.
(Continued)

*Primary Examiner* — Thien M Le
*Assistant Examiner* — Claude J Brown
(74) *Attorney, Agent, or Firm* — Oliff PLC

(57) ABSTRACT

A security element is provided for a document of value. The security element includes an array of apertures through at least a portion of the document of value, the arrangement of apertures relative to one another forming an observable data item. The array of apertures includes apertures of at least two different shapes or orientations, the occurrence of the different shapes or orientations within the array representing an encoded data item. Also provided is a method of manufacturing a security element on a document of value, including: obtaining a first data item and generating an aperture array template; obtaining a second data item and encoding the second data item within the aperture array template; and perforating at least a portion of the security document according to the encoded aperture array template.

25 Claims, 9 Drawing Sheets

(51) Int. Cl.

| | |
|---|---|
| ***G06K 7/14*** | (2006.01) |
| ***G07D 7/00*** | (2006.01) |
| ***B42D 25/41*** | (2014.01) |
| ***B42D 25/43*** | (2014.01) |
| ***B42D 25/29*** | (2014.01) |
| ***B42D 25/00*** | (2014.01) |
| *B42D 25/333* | (2014.01) |
| *B42D 25/346* | (2014.01) |

(52) U.S. Cl.

CPC ................ *B42D25/41* (2014.10); *B42D 25/43* (2014.10); *B42D 25/29* (2014.10); *B42D 25/00* (2014.10); *B42D 25/333* (2014.10); *B42D 25/346* (2014.10)

USPC ............ 235/458; 235/454; 235/439; 235/435

(56) References Cited

U.S. PATENT DOCUMENTS

| | | | | |
|---|---|---|---|---|
| 2008/0106091 | A1 * | 5/2008 | Tompkin et al. | 283/91 |
| 2008/0216976 | A1 | 9/2008 | Ruck et al. | |
| 2012/0176652 | A1 * | 7/2012 | Green | 358/3.28 |

FOREIGN PATENT DOCUMENTS

| | | | | | |
|---|---|---|---|---|---|
| GB | 2433469 | A | * | 6/2007 | B42D 15/00 |
| WO | WO 95/26274 | A1 | | 10/1995 | |
| WO | WO 97/18092 | A1 | | 5/1997 | |
| WO | WO 02/39397 | A1 | | 5/2002 | |
| WO | WO 03/099580 | A1 | | 12/2003 | |
| WO | WO 2004/011274 | A1 | | 2/2004 | |
| WO | WO 2008/007064 | A1 | | 1/2008 | |
| WO | WO 2008007064 | A1 | * | 1/2008 | B42D 15/00 |
| WO | WO 2008/093093 | A2 | | 8/2008 | |

OTHER PUBLICATIONS

Written Opinion of the International Searching Authority issued in International Patent Application No. PCT/GB2011/050230 dated Jun. 7, 2011.

* cited by examiner

Fig.6.
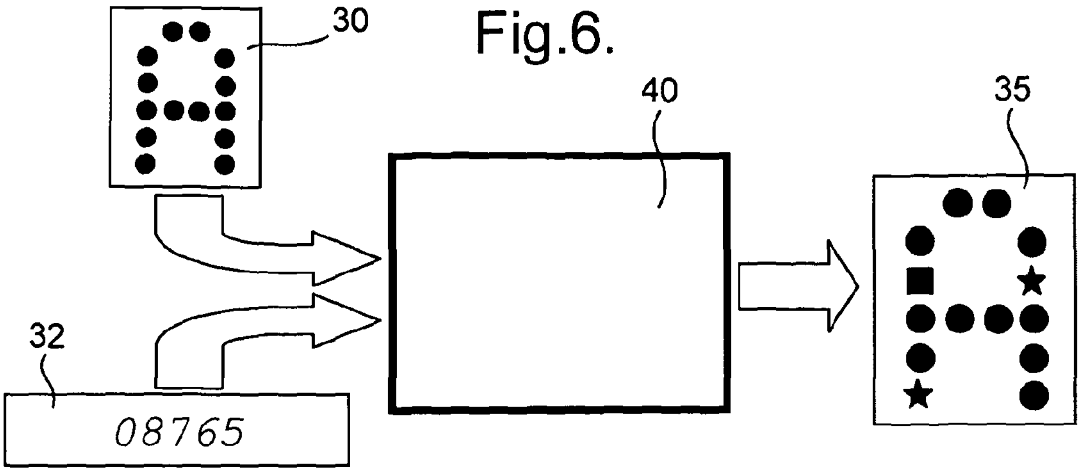
Fig.7.
41
| Data | Encoded as |
|---|---|
| 08762 | ●✦●●✦●●●☆● |
| 08763 | □✦●● ●●●☆□□ |
| 08764 | ●●●☆●□□□☆● |
| 08765 | ●●●●□☆●●●● |
| 08766 | □✦● ●●☆□✦●● |
Fig.8.
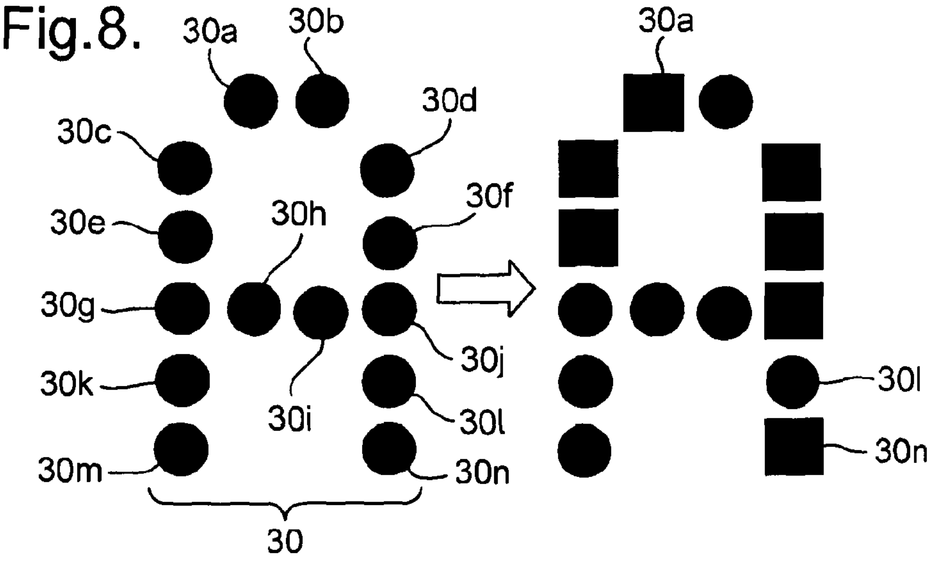

51

| Serial No. | Encoded data | Shape algorithm |
|---|---|---|
| A123453 | XYZ987 | Algorithm 1 |
| A123454 | PQR543 | Algorithm 2 |
| A123455 | LMN246 | Algorithm 3 |
| A123456 | JKL975 | Algorithm 1 |

61

| Chip ID | Shape algorithm parameters | Shapes |
|---|---|---|
| 543765987 | W | ●+●●+●●●☆● |
| 321432543 | X | □+●● ●●●☆□□ |
| 098876765 | Y | ●●●☆●□□□☆● |
| 765543765 | Z | ●●●●□☆●●●● |

SECURITY ELEMENT FOR DOCUMENT OF VALUE

This invention relates to security elements for documents of value such as passports, identification cards, banknotes, certificates and the like, methods of manufacture thereof and corresponding authentication systems.

In the field of security documents, there is an ever present need to ensure the authenticity of the document and deter potential counterfeiters. With this aim, documents of value such as passports, identification cards, licences, banknotes, certificates and the like are commonly provided with security elements which are difficult, if not impossible, to reproduce without sophisticated equipment. One category of such security elements is perforated features, such as the perforated serial number typically found in passport booklets. Perforated features such as these enhance the security of the document since the feature cannot be reproduced by photocopying or printing, but must be formed in a separate processing step, thus enhancing the difficulty of making a copy of the document. In addition, an existing perforation cannot easily be altered in an unnoticeable manner. Whilst perforations can be formed by mechanical means, such as perforation pins, the security can be still further enhanced by specifying that the perforations are to be formed by laser, which not only enables a more intricate perforated design, but additionally imparts characteristics such as a darkening of the material forming the document, which cannot easily be imitated. Since the cost of suitable laser perforation equipment is high, this presents a further barrier to the potential counterfeiter.

However, due to their very visible nature and relative ease of manufacture compared to other forms of security element (such as holograms or magnetic features, for example), perforations alone are generally not considered to provide a document with adequate security. In addition, the amount of information which can be carried by a feature such as a perforated serial number is limited. A number of approaches have been proposed for enhancing the security of perforated security elements. For example, in EP-A-0861156, perforations of very small diameter are arranged to form a pattern which is visible in transmitted light but invisible in reflection to the naked eye. US-A-2006/0006236 discloses a perforated grid in which elongate holes are arranged in two orientations such that, when the document is viewed at an acute angle, a latent image is revealed, since those apertures aligned with the direction of viewing will transmit more light than the others.

In WO-A-95/26274, the high level of detail available through the use of a laser beam to produce perforations is made use of by applying fine structures such as a wave-like edge to an otherwise conventional perforated number in order to individualise the document. Finally, WO-A-02/39397 discloses the inclusion of secret codes in a perforated serial number by shifting the perforations along various axes or changing the point diameter of certain perforations, amongst other examples.

In accordance with the present invention, a security element is provided for a document of value, the security element comprising an array of apertures through at least a portion of the document of value, the arrangement of apertures relative to one another forming an observable data item, wherein the array of apertures comprises apertures of at least two different shapes or orientations, the occurrence of the different shapes or orientations within the array representing an encoded data item.

By encoding a second data item within a perforated element through the use of different aperture shapes or orientations, not only is the information capacity of the element greatly increased, but also its security, since the meaning of the encoded data item (and hence the ability to reproduce it) will not be apparent to an observer unless they have knowledge of the manner in which the different shapes or orientations are selected in order to represent the encoded data item. In this way, the difficulty of making counterfeit security elements (e.g. for a fraudulent passport) is greatly increased since not only will the counterfeiter have to form the correct observable data item (such as a perforated serial number to match that printed on a data page of a passport booklet) but, additionally, they must form the observable data item from apertures having the correct assortment of shapes or orientations according to an algorithm or other scheme which is unknown to them. In addition, the inherent difficulty of manufacturing the perforated security element is also increased, since the counterfeiter will require apparatus capable of producing apertures of the appropriate shapes, such as multiple perforation pins of different outlines or precisely controllable laser perforation equipment.

The "shape" of an aperture refers to its geometrical outline. Shapes may differ from one another by having a different number or configuration of sides, different lengths of the sides relative to one another, a different number, arrangement or angles of corners, or at least a different aspect ratio. For instance, two circular apertures, one having a larger diameter than the other, would not be considered to be of different shapes since the essential outline of each is the same, differing only in scale. In contrast, a first rectangle having long edges twice as long as its short edges would be considered a different shape from a second rectangle having long edges three times as long as its short edges, since here the aspect ratios differ. By arranging the apertures to have different shapes in this way, the different types of aperture can be readily recognised by imaging equipment (indeed the different shapes will generally be apparent to the human eye), enabling the second data item to be decoded with a high degree of accuracy. In addition, the number of different shapes which can be individually recognised and distinguished from one another is virtually limitless, enabling a very high density of additional information to be encoded into the perforated security element.

The "orientation" of an aperture refers to the layout of the aperture on the surface of the security document, e.g. in terms of its rotational position about an axis normal to the surface of the security document through which the aperture is made. Different orientations can also be achieved by reflecting the outline of aperture about an axis within the plane of the document. For example, a first elongate rectangular aperture arranged parallel to an edge or other feature of the document is considered to have a different orientation from a second elongate rectangular aperture of the same aspect ratio having its long axis making a non-zero angle with the same feature of the document. By arranging apertures making up the observable data item to have different orientations in this way, a substantial volume of data can be encoded into the perforated security element. Of course, in order that the different orientations are recognisable, the apertures should not have a highly symmetric shape. In particular, apertures having full circular symmetry will not be suitable for this purpose.

The encoded data item can be represented within the array of apertures utilising either different shapes o f the apertures, or different orientations (with all apertures being of the same shape), or a combination of the two approaches, using apertures of different shapes and/or orientations.

The observable data item, formed by the relative positions of the apertures in the array (independent of their shapes) can take any desirable form. For example, the observable data item could be a perforated image, such as the outline of a corporate logo, or any other pictorial design, e.g. a house, person or animal. Preferably, at least the outline of such an image would be demarcated by the arrangement of apertures, although additional apertures could be provided to represent shading. However, in preferred examples, the observable data item is a symbol, preferably a (single) letter or numerical digit. For instance, the letter or digit may be one of many making up a perforated code or serial number, as described below. In all cases it is preferred that the observable data item conveys some recognisable, intelligible information to the human viewer, whether in the sense of alphanumerics or as a symbol or image.

The second data item can be converted into a corresponding arrangement of aperture shapes and/or orientations in various ways. For example, the encoded data item could be linked in a database to a randomly selected arrangement of aperture shapes/orientations which should be applied to an observable data item in order to represent that encoded data item. Alternatively, a predefined algorithm could be used to convert the encoded data item into shapes or orientations. However, to make best use of the data storage capacity available, preferably the encoded data item is represented by at least one of the apertures designated as a multi-level bit, the shape and/or orientation of the designated aperture representing its bit-level. The "bit-level" refers to the set of available "states" for each bit, e.g. "low" and "high", or "on" and "off". By using at least some of the apertures to represent bits of data and using the shape or orientation of the aperture to specify the level of each bit, a very large number of different encoded data items can be accommodated. The greater the number of shapes and/or orientations (i.e. bit-levels) available, the greater the data capacity of the system. Preferably the value represented by the bit-level of the or each bit is related to the position of the bit within the array of apertures, although this is not essential. Thus, advantageously the encoded data item is represented by at least one of the apertures designated as a multi-level bit, the shape and/or orientation of the designated aperture in combination with the location of the designated aperture within the array representing its bit-value.

Hence, in particularly preferred examples, the encoded data item comprises at least one bit of data, the or each bit being represented by a selected aperture within the array, and each bit having a value selected from at least two bit-values, represented by the shape, orientation and/or location of the or each selected aperture. To increase the complexity of the security element, the encoded data item preferably comprises a plurality of bits of data, each bit being represented by a separate selected aperture within the array.

As already noted, the observable data item formed by the arrangement of apertures is preferably a single symbol such as a letter or numerical digit. As such, whilst the array could be a stand-alone feature, in many implementations it is preferred that the security element comprises multiple arrays of apertures, each of the arrays of apertures forming a discrete observable data item and each including an encoded data item represented by the occurrence of different shapes or orientations of apertures within the array. For instance, each of the discrete observable data items may be a letter or digit, and encoded data can be provided within each of them. It should be noted however that further arrays of apertures without any encoded data could be included in the security element.

Preferably, the discrete observable data items formed by the multiple arrays of apertures collectively form a visible code, the visible code being preferably at least part of a serial number or other unique identifier of the document of value. Advantageously, the encoded data items of the multiple arrays collectively form a hidden code. It should be noted that, unlike the observable data items, the encoded data items in multiple arrays need not be discrete, i.e. recognisable independently of one another. For example, depending on the algorithm used to encode the data, it may be necessary to retrieve the arrangement of aperture shapes or orientations from each of the multiple arrays of apertures before the data contained in any one can be decoded.

The encoded data item (or the hidden code, where there are multiple arrays of encoded apertures) could contain any desirable information, and may also take the form of a unique identifier. For instance, in the case of a passport or identity document, the encoded data item could relate to the identity of the document holder, including for example, their name and/or date of birth. However, in particularly preferred examples, the encoded data item (or hidden code) is derived from the observable data item (or the visible code). This enables the authenticity of the security element to be checked internally, i.e. against itself.

This can be achieved in a number of ways. For example, the observable data item could be linked in a database to a corresponding encoded data item. However, preferably, the encoded data item is obtained by applying an algorithm to the observable data item. In particularly preferred embodiments the encoded data item comprises verification data enabling verification of the observable data item. That is, the encoded data item acts as a check digit for confirming that the observable data item has been read correctly.

The apertures could be formed using any suitable process such as mechanical perforation or grinding, but in preferred examples, the apertures are formed by laser perforation. This has the advantage that a large number of different aperture shapes and orientations can be formed by the same apparatus.

Any aperture shapes could be used as desired. However, in preferred examples, the at least two different shapes comprise any of: circles, ellipses, triangles, squares, rectangles, polygons, stars, numbers, letters, typographical symbols or punctuation marks.

The size of the apertures may vary depending on their shape, but preferably the apertures forming the array each have approximately the same maximum dimension or surface area. By arranging the different shapes of apertures to be of approximately the same size, the assortment of shapes is less immediately apparent to an observer since the darkness (or brightness, if the document is being viewed in transmission) will be approximately the same for each aperture. The apertures are preferably visible to the naked eye under reflected and transmissive illumination.

As noted above, it is preferable that the encoded data item can be checked against the observable data item itself. However, in other implementations, the encoded data item could be checked against other information provided on the document of value. As such, the present invention further provides a security element assembly, comprising a security element as described above and a machine readable element, both the security element and the machine readable element being arranged on a document of value, the machine readable element having stored therein validation data against which the encoded data item can be checked. Any suitable machine readable element could be used for this purpose, but preferably the machine readable element comprises a RFID chip, a barcode, a two-dimensional barcode, a digital watermark or an optical character recognition code such as a Machine Readable Zone (MRZ) on a passport. The machine readable element can include the use of detectable materials that react to an external stimulus such as fluorescent, phosphorescent, infrared absorbing, thermochromic, photochromic, magnetic, electrochromic, conductive or piezochromic materials.

The nature of the validation data will depend on the type of encoded data item and the level of security required. For example, on a passport, the encoded data item could relate to biographic or biometric data of the passport holder, which may already be stored in a RFID chip on the passport for other purposes, in which case this stored data can also be used for validation. Alternatively, if the encoded data item is a code or similar, that code could be added to the security element for checking against the encoded data item. Thus, preferably the validation data comprises the encoded data item. However, this is not essential and the validation data could, for example, comprise an algorithm through which the observable data item and the encoded data item are related, or parameters of such an algorithm, to be inserted into an algorithm template known to the document issuer.

The invention further provides a document of value comprising a security element as described above or a security element assembly as described above. Preferably the document of value is a passport, identification card, licence, banknote, cheque or certificate.

The present invention further provides an authentication system for checking the authenticity of a document of value having a security element as described above or a security element assembly as described above, the system comprising an image capture device adapted to obtain an image of at least a portion of the security element, an image processor adapted to identify the shape of at least one selected aperture in the image and an authentication processor adapted to determine whether the identified shape(s) and/or orientations meet predetermined authentication criteria. The image capture device can be implemented in any convenient manner, viewing the document of value in transmitted or reflected light. A camera, scanner or any other suitable device for imaging the document of value could be used for this purpose. The image processor preferably identifies the shapes (or orientations) and locations of the apertures within the array using shape-recognition software.

The authentication processor can be arranged to determine whether the identified shapes or orientations in the image meet predetermined authentication criteria, i.e. whether the encoded data item is valid, in many different ways.

As already mentioned, the encoded data item is preferably linked to the observable data item. As such, in a preferred embodiment, the image processor is further adapted to read the observable data item of the security element from the image, and the authentication processor is adapted to determine whether the identified shape(s) or orientation(s) meet predetermined authentication criteria based on the observable data item read from the security element. The observable data item can be linked to the encoded data item (and hence the shapes to be identified in the image) in various different ways. In one preferred example, the predetermined authentication criteria is associated with the observable data item and the authentication processor is adapted to retrieve the predetermined authentication criteria associated with the observable data item from a database by looking up the observable data item read from the security element in the database. For example, here the authentication criteria may comprise the arrangement of shapes or orientations expected to be found in a security element having the retrieved observable data item. The expected arrangement of shapes or orientations can then be compared with the identified arrangement of shapes or orientations to determine whether there is a match. If so, authenticity of the document can be confirmed. In alternative preferred implementations, the authentication processor is adapted to determine whether the identified shape(s) or orientation(s) meet predetermined authentication criteria by determining whether the relationship between the observable data item read from the security element and the identified shape(s) or orientation(s) conforms to a predefined algorithm. The predefined algorithm may be stored by the authentication processor and applied to all documents of value of the same type. Alternatively the algorithm could be retrieved by looking up the observable data item read from the security element in a database.

Where the document of value is provided with a security element assembly including a machine readable element in addition to the security element, the authentication system preferably further comprises a device for reading the machine readable element of the security element assembly and the authentication processor is adapted to determine whether the identified shape(s) or orientation(s) meet predetermined authentication criteria based on the validation data stored in the machine readable element. The nature of the reading device will depend on the type of machine readable element deployed. For example, where the machine readable element is a RFID tag, the reading device may comprise a corresponding RFID reader. Alternatively, if the machine readable device is optically readable, the reading device may comprise a suitable imaging element and appropriate processing means. In this case, the image capture device used to obtain an image of a portion of the security element can also be used to image the machine readable element.

The present invention also provides a method of manufacturing a security element on a document of value, comprising: obtaining a first data item and generating an aperture array template, the apertures in the array template being arranged such that the first data item is observable from the arrangement of apertures, obtaining a second data item and encoding the second data item within the aperture array template by assigning one of at least two different shapes or orientations to each of the apertures in the array template according to a predefined algorithm, whereby the encoded aperture array template comprises apertures of at least two different shapes or orientations, the occurrence of the different shapes or orientations representing the second data item, and perforating at least a portion of the security document according to the encoded aperture array template. As already described, by encoding a data item within a perforated security element arranged to convey another data item, both the security and the information storage capacity of the security element are greatly enhanced. The above method of manufacture is particularly advantageous since this enables the element to be formed in a single perforation step.

Preferably the first (observable) data item is a symbol, preferably a letter or numerical digit.

In particularly preferred embodiments, the method further comprises designating at least one of the apertures in the aperture array template as a multi-level bit and assigning the or each designated apertures a shape and/or orientation representing a bit-level in accordance with the second data item. Advantageously, the assigned shape and/or orientation of the or each designated aperture in combination with its location within the array represents a bit-value in accordance with the second data item. As described above, encoding the data in the form of bits makes best use of the available data storage capacity. Preferably, the second data item comprises at least one bit of data, and the step of assigning one of at least two different shapes and/or orientations to each of the apertures in the array template comprises selecting an aperture within the aperture array template to represent the or each bit of data, and assigning a shape or orientation, based on the bit-value of the respective bit of data, to the or each selected aperture.

As described above, the encoded or second data item can take many forms but in preferred examples is associated with the observable (first) data item. Hence, advantageously, obtaining the second data item comprises performing an algorithm on the first data item to generate the second data item.

The apertures can be formed in a number of ways but, preferably, the step of perforation comprises laser perforation.

The invention further provides a method of manufacturing a security element assembly on a document of value, comprising manufacturing a security element as described above, providing a machine readable element on the document of value, and storing, in the machine readable element, validation data against which the encoded data item can be checked.

Examples of security elements, methods of making thereof and corresponding authentication systems will now be described and contrasted with known security elements with reference to the accompanying drawings, in which:

FIG. 1*a* schematically depicts a known example of a document of value;

FIG. 1*b* shows in detail a security element of the known document of value;

FIG. 1*c* shows enlarged details of the security element of the known document of value, in cross-section;

FIG. 2 shows a first embodiment of a security element, selected features being enlarged for clarity;

FIGS. 3*a* and 3*b* show schematic examples of security elements;

FIG. 4 shows further schematic examples of security elements;

FIGS. 5*a* and 5*b* show a second embodiment of a security element, in the form of a graphical simulation and as a perforation, respectively;

FIG. 6 illustrates a process of encoding data into the security element;

FIG. 7 illustrates an extract from a database associating encoded data items with corresponding aperture shapes;

FIG. 8 shows an example of a security element before and after encoding according to an exemplary base-2 encoding system;

Figures 9, 10, 11:
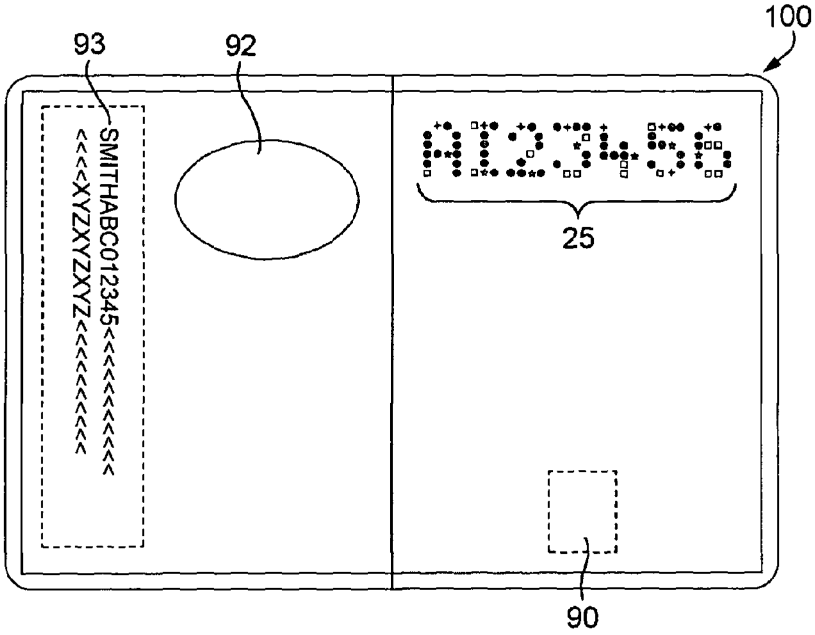
FIG. 9 shows an extract from a database associating observable data items with corresponding encoded data items.
Figure 12:
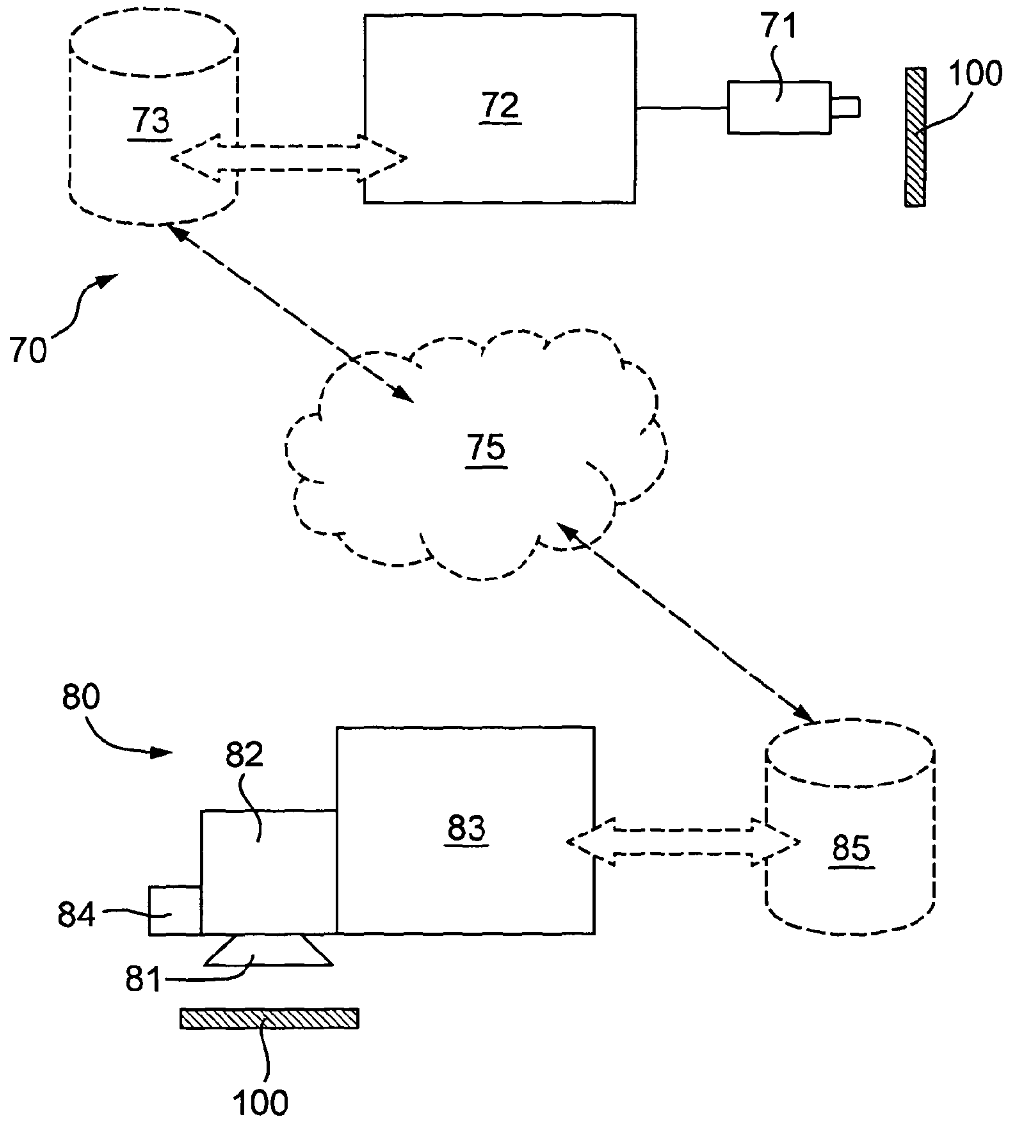
Figure 13:
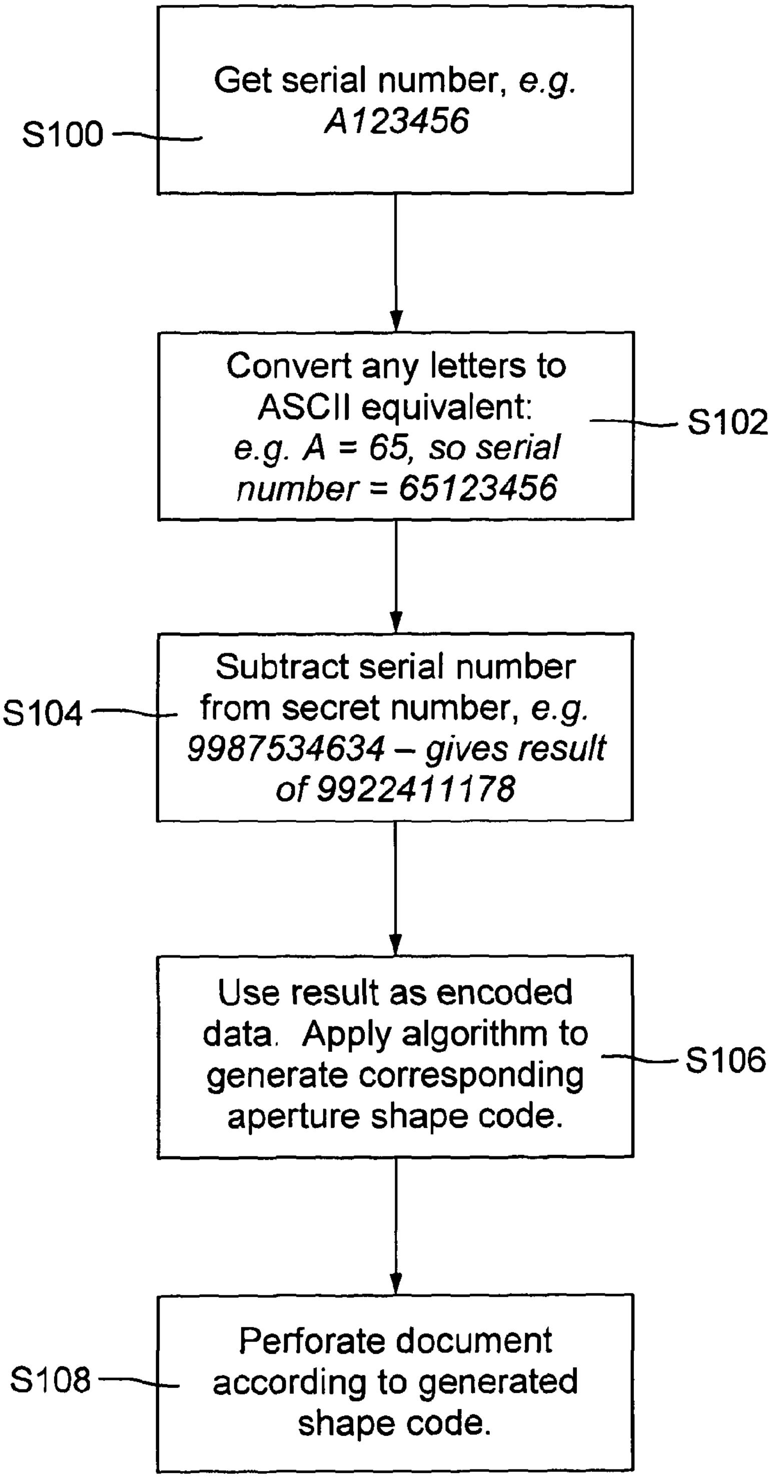
Figure 14:
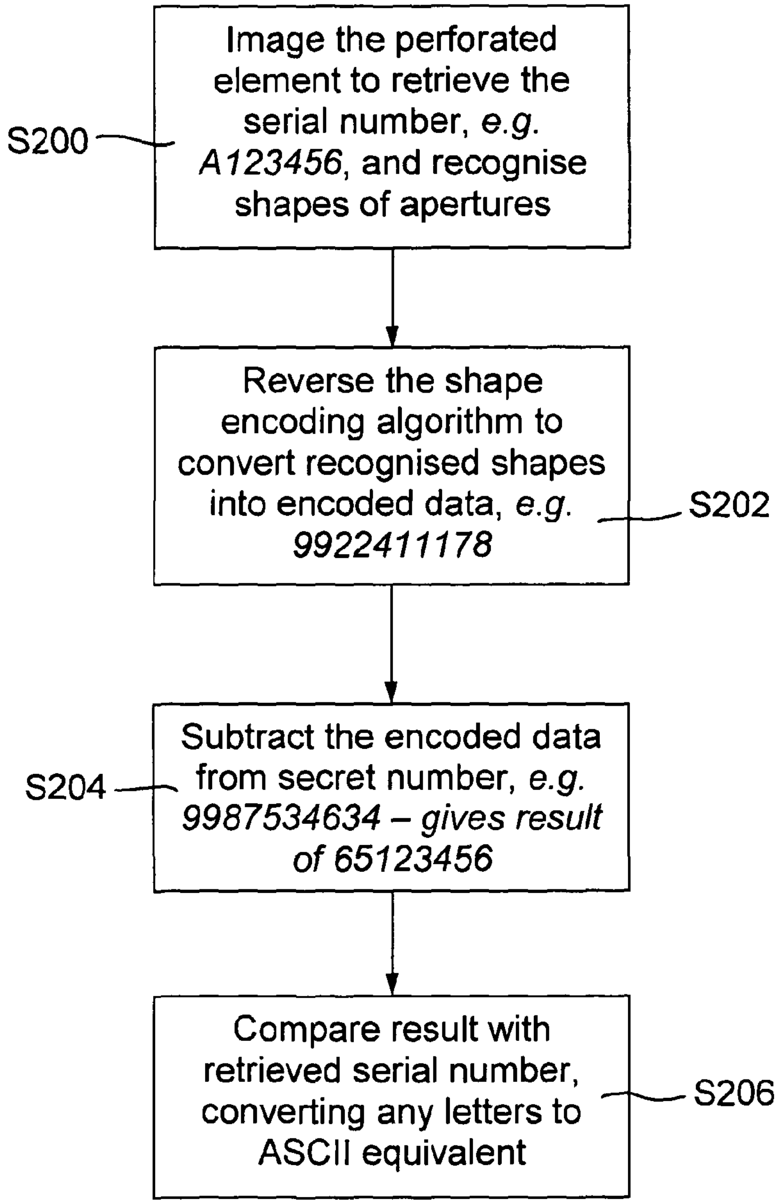
Figure 15:
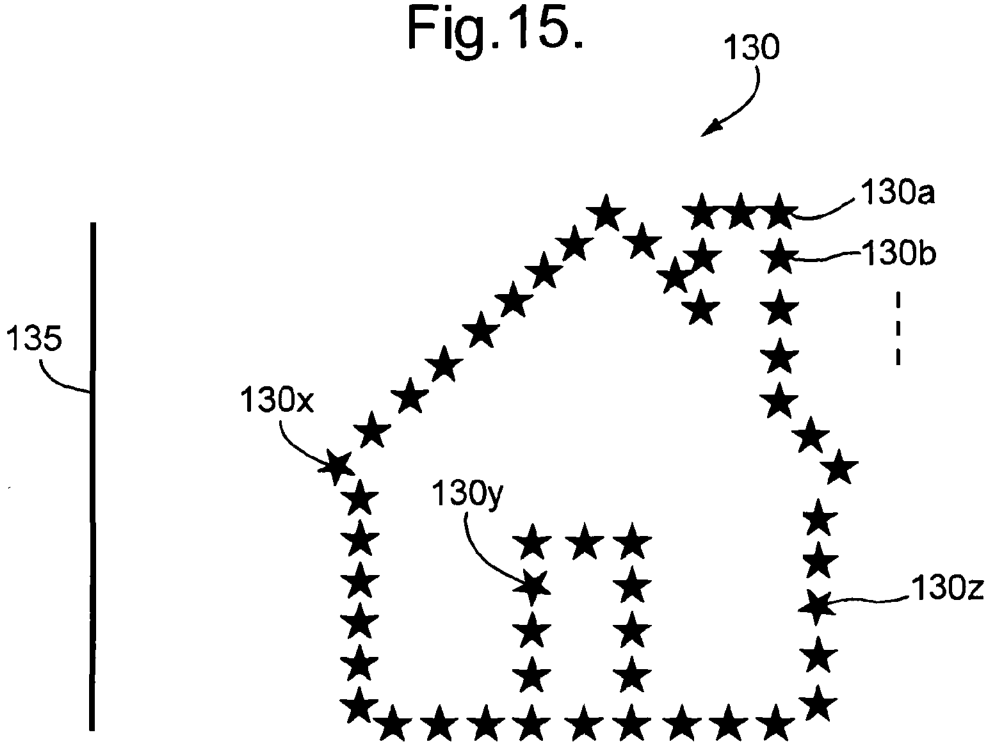

FIG. 10 schematically depicts a document of value according to a further embodiment;

FIG. 11 is an extract from a database associating data from a machine readable element provided on the document with aperture shapes and/or algorithm parameters;

FIG. 12 schematically illustrates apparatus for manufacturing a security element, and apparatus for authenticating a document provided with the security element;

FIG. 13 depicts exemplary steps involved in the manufacture of a security element;

FIG. 14 depicts exemplary steps involved in the authentication of a document carrying the security element;

FIG. 15 shows a further embodiment of a security element; and

Figure 16:
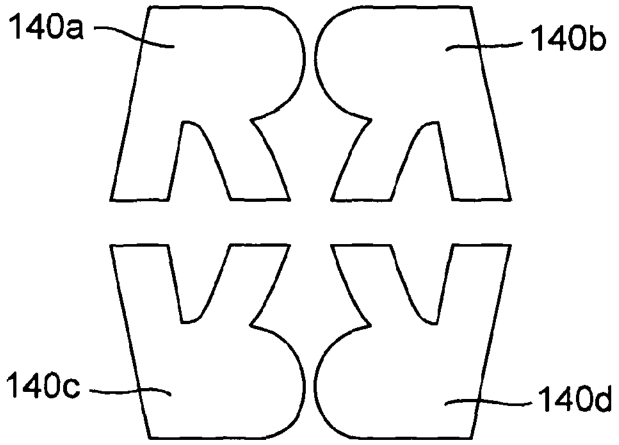

FIG. 16 depicts four exemplary apertures in different orientations.

The ensuing description will largely focus on the example of security elements applied to passports. However, it will be appreciated that the disclosed security elements can be applied to any document of value, including for example, identity cards, banknotes, certificates, cheques and the like. The document typically comprises one or more sheets of material (such as paper, card, polymer, a combination thereof or any other suitable material), through at least one of which the perforations will be made. The document could also take the form of a label insert, tag or other element, which is for application to another article.

Figure 1A:
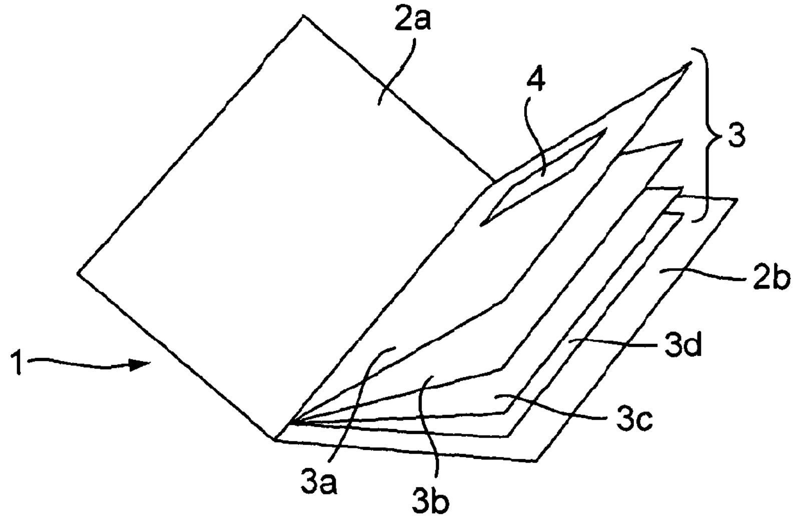

FIG. 1 shows an example of a known passport booklet 1. The booklet 1 comprises front and rear covers 2*a* and 2*b* into which are bound a number of internal pages 3. In this example, the booklet is shown to include four internal pages 3*a*, 3*b*, 3*c* and 3*d* but in practice any number of such pages could be provided. The booklet 1 is provided with a number of security elements including a perforated serial number, indicated generally in FIG. 1*a* as item 4.

Figure 1B:
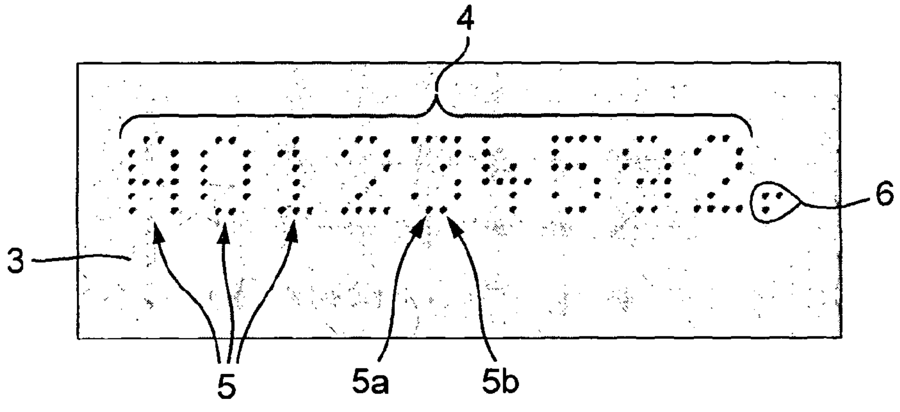

The perforated serial number 4 is shown in more detail in FIG. 1*b*, which is an image of the upper surface of any of the internal pages 3. The security element 4 is a perforated serial number uniquely identifying the document, made up of nine arrays of apertures (each designated 5), each representing a letter or digit, which together make up the code "A01234592". In this example, the serial number is also provided with a check digit 6 which is generated according to a function based on the depicted serial number and therefore acts to verify whether the serial number has been read correctly. Each of the letters or numbers 5 is made up of an array of apertures, of which two are labelled 5*a* and 5*b*. The apertures are all of identical size and shape.

Figure 1C:
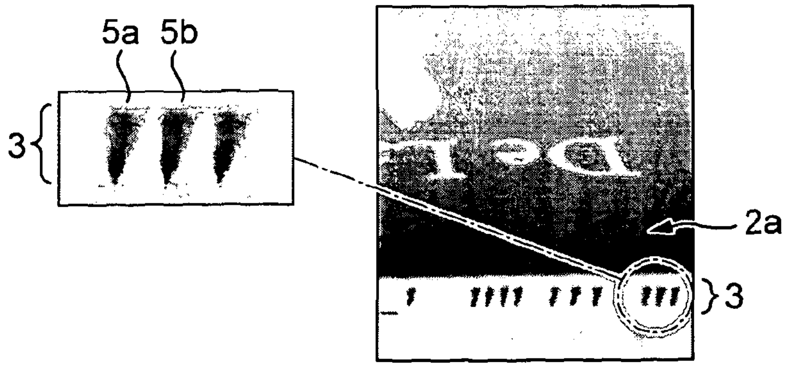

FIG. 1*c* shows a cross-section through a portion of the security element 4 from which it can be seen that each of the apertures 5*a*, 5*b*, etc, passes through all of the internal pages 3 of the document 1 (although this need not be the case). In this example, the apertures 5*a* and 5*b* are formed by laser perforation, which results in the substantially conical shape visible in cross-section.

Figure 2:
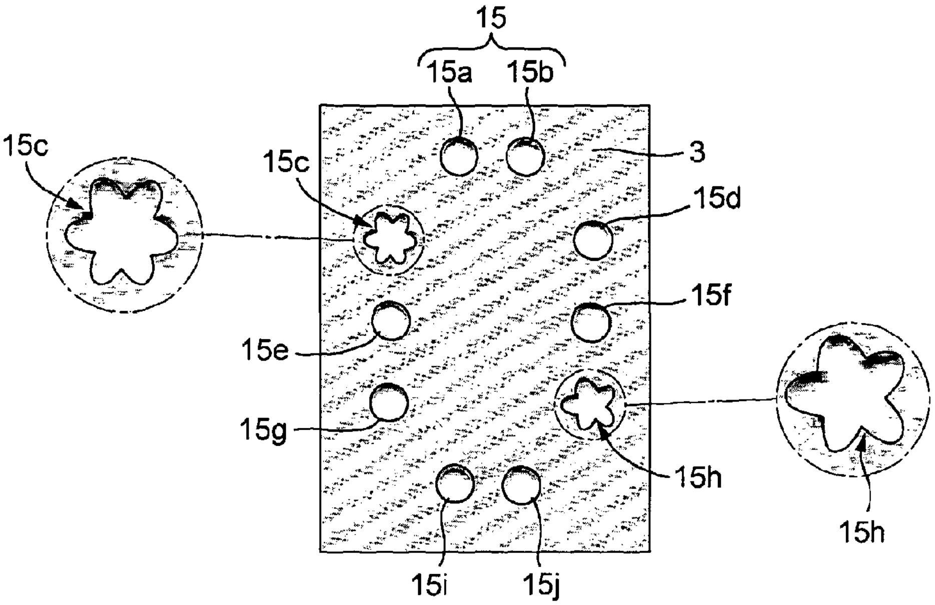

FIG. 2 shows a first embodiment of a security element made in accordance with the presently disclosed technique. The security element 15 comprises an array of apertures, ten in this example, positioned relative to one another on the page 3 so as to form the digit "0". The number and position of the apertures is selected in order to visibly convey the desired symbol "0" in accordance with well known techniques. However, the apertures are now formed from an assortment of different shapes. In particular, whilst eight of the ten apertures are circular, those at positions 15*c* and 15*h* are star-shaped. Aperture 15*c* is a six-pointed star, whilst that at 15*h* is a five-pointed star. Selecting the shape of each aperture in the array can thus be used to convey an additional level of data over and above the visible data conveyed by the relative arrangement of the apertures. This data is referred to as "encoded" since its meaning is not directly intelligible to the observer (unlike the digit "0" formed by the positions of the apertures).

Any assortment of shapes could be used to encode data into the aperture array in this way. The above example uses a selection of circular and star-shaped apertures, but in other examples, the apertures could be square, rectangular, triangular, polygonal, elliptical, irregular or take the shape of well known symbols such as letters, numbers or punctuation marks. By forming the constituent apertures in different shapes, the encoded data can be easily and reliably recognised by suitable imaging apparatus provided with shape recognition software. Since the number of different shapes which could be used to form the aperture array is virtually unlimited, the amount of data which can be represented by the different shapes is extremely high. As will be described below with reference to FIG. 15, as an alternative (or in addition to) the use of different shapes, the orientation of selected apertures within the array may be controlled to encode the data into the array.

Figure 3A:
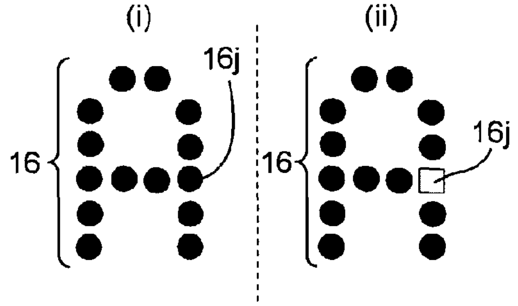
Figure 3B:
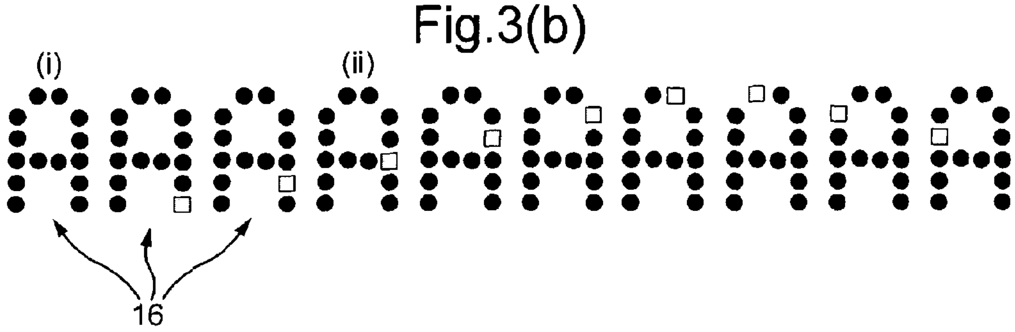
Figure 4:
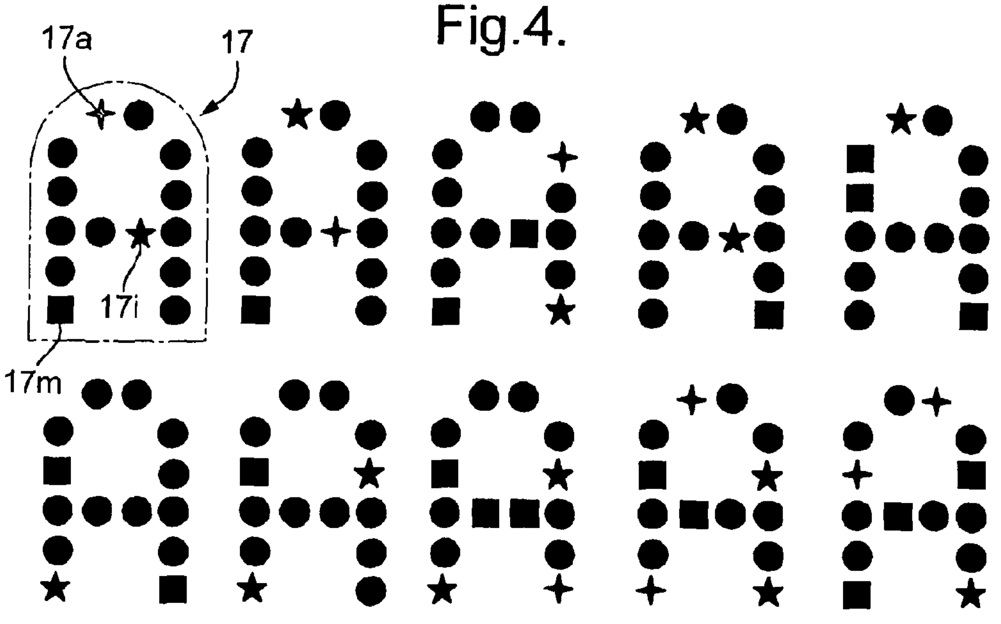

FIG. 3 illustrates the scenario where just two different shapes of aperture are made available for encoding purposes, here a circle and a square. FIG. 3*a* shows two security elements labelled (i) and (ii) alongside one another for comparison. In each case, the security element comprises an array of apertures 16 of which only one is labelled (16*j*) for clarity. In security element (i), all of the apertures are circular, including 16*j*. However, in security element (ii), aperture 16*j* is square. Thus, aperture 16*j* can be said to represent one bit of data, having two bit-levels: either a low state (circular) or a high state (square). FIG. 3*b* illustrates ten security elements of similar construction, including examples (i) and (ii), in which different ones of the 14 apertures making up the letter “A” are selected to provide the bit of information. Since, in this example, the letter “A” is formed of 14 apertures, if every one of the apertures in the array is arranged to act as a bit of information with two bit-levels (“circle” or “square”) the encoded data capacity of the single letter “A” would be $2\times10^{14}$ bits. Of course, only a subset of the apertures in the array may be selected to act as data bits if preferred. The data capacity of the security element can be increased still further by increasing the number of different shapes of aperture available (i.e. increasing the number of bit-levels). This is illustrated schematically in FIG. 4 for ten further security elements, each of which again conveys the observable data item “A”. In this example, the security element 17, again comprising 14 apertures, is formed of an assortment of circular apertures, square apertures, four-pointed stars and five-pointed stars. For instance, in security element 17 of FIG. 4, the aperture in position 1 (labelled 17*a*) has a four-pointed star shape, the aperture in position 9 (labelled 17*i*) is a five-pointed star, and the aperture in position 13 (labelled 17*m*) is a square, whilst the remaining 11 apertures are all circular. If every aperture in the array is used to convey data and can take one of these four bit-levels (represented by the four different shapes), the security element 17 has an encoded data capacity of $4\times10^{14}$ bits. The other security elements illustrated alongside element 17 in FIG. 4 provide examples of some of the other permutations of apertures which may be used to form the same observable data item “A” using these four selected aperture shapes. Each of these configurations can correspond to a different encoded data item, the nature of which will be discussed further below.

Figure 5A:
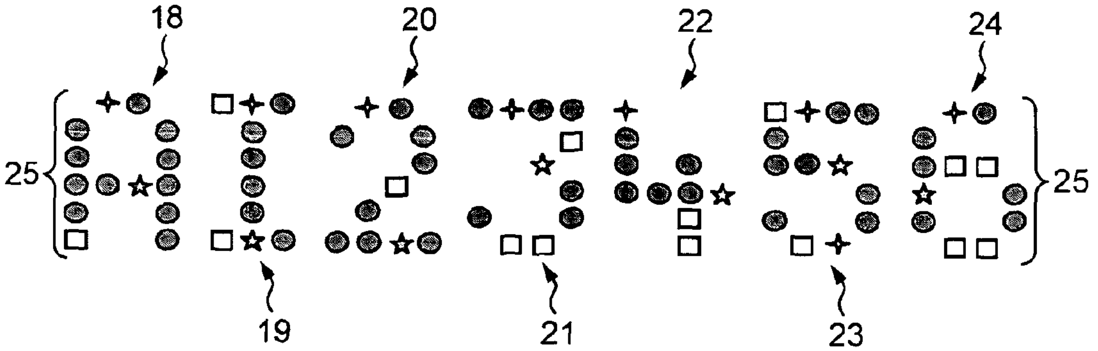
Figure 5B:
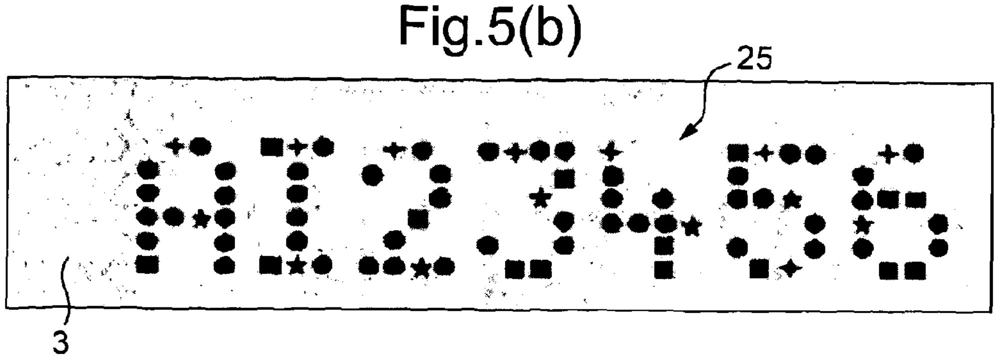

Any of the security elements already described can be deployed as a stand-alone security element, or used in conjunction with further arrays of apertures in order to increase the amount of data which is observable to a viewer. For example, the security element 17 indicated in FIG. 4 could be used to replace the first symbol “A” of the otherwise conventional perforated serial number 4 depicted in FIG. 1*b*. However, in order to increase the data capacity of the security element still further, in many cases it is preferred that multiple arrays of apertures be provided, each one being encoded with data in accordance with the above described principles. FIG. 5 shows an example of this, depicting a security element 25 according to a second embodiment. FIG. 5*a* shows a graphical representation of the security element 25, and FIG. 5*b* shows the same security element 25 perforated into a page 3 of a passport document such as that shown in FIG. 1*a*.

In this example, the security element 25 is made up of seven arrays of apertures, each one forming an observable data item from the arrangement of the apertures included therein. The first array 18 is arranged to form the letter “A”, the second array 19 is arranged to form the number “1”, the third array 20 is arranged to form the number “2” and likewise arrays 21, 22, 23 and 24 are arranged to form the digits “3”, “4”, “5” and “6” respectively. It will be appreciated that the data item observable from each array is a result of the position and number of apertures in the array, and is independent of the individual apertures’ shapes. Nonetheless, on close inspection it will be seen that each array of apertures 18 to 24 is made up of an assortment of differently shaped apertures in the same manner as discussed above in respect of FIG. 4. Thus, an encoded data item is included in each of the arrays 18 to 24, represented by the configuration of shapes. The encoded data items may be discrete (i.e. recognisable from each individual array alone and separable from the other encoded data), or may be inter-dependent on the data encoded within one or more of the other arrays. For example, the first two arrays 18 and 19 could be used individually to provide data capacity of $4\times10^{14}$ and $4\times10^{10}$ bits respectively, or could be used combinedly to represent a single encoded data item having a capacity of up to $4\times10^{24}$.

However the data is encoded, the combined encoded data from the arrays 18 to 24 as a whole represents a hidden code, the data capacity of which can be increased by increasing the number of shapes available, increasing the number of apertures in individual arrays and/or increasing the number of aperture arrays included in the element. Alongside the encoded data, the security element 25 conveys a visible code (in this case “A123456”) which is recognisable to a human observer as well as to optical recognition software. Thus, the element can be used to provide a serial number or indeed any other visible perforated data, and can replace the conventional perforated serial number 4 shown in FIG. 1*b*. In general, each of the aperture arrays 18 to 24 will represent a single, discrete data item such as a symbol, i.e. a letter, a numerical digit, a punctuation mark or the like. Alternatively, the array could be provided in the form of a perforated graphic such as the outline of a corporate logo or similar. In each case, the symbol is conveyed by the arrangement of the apertures, rather than by their shapes.

As illustrated in all the above examples, it is generally preferred that the different shapes of aperture have approximately the same size. F or example, the maximum dimension of each aperture or, even more preferably, the cross-sectional area of each should be similar. This not only assists in rendering the observable data accurately (since the relative positions of the apertures are not distorted on account of the differing shapes), but in addition, renders the encoded data less conspicuous to an observer, since each of the apertures will transmit or reflect approximately the same amount of light (depending on whether the feature is being observed in reflected or transmitted light) and hence will not have a dramatically different appearance.

The apertures can be formed through the security document using any desirable technique, such as perforation pins or grinding between suitably patterned abrasive plates. However, in preferred implementations, the apertures are formed by a laser controlled by a suitable processor as will be described further below. Laser perforation is preferable since not only does it permit each of the apertures to be formed using the same apparatus but it additionally imparts characteristics such as blackening and a conical cross-section to the perforations, which further increases the difficulty of forging a counterfeit.

The data which is encoded into the security element through the use of different shapes can take many different forms, of which some examples will now be provided. FIG. 6 shows a generalised process for generating a security element of the sort described above, to include encoded data. Here, an exemplary observable data item 30 is the letter “A”. In practice, the specific observable data item may be obtained in a number of ways, for example from a database or by reading data already provided on the document to which the security element is to be applied. For example, where the observable data item 30 is to correspond to the serial number of a passport, this may already be printed on at least one region of the passport and this could be read (by a machine or otherwise) to determine the desired observable data item. The observable data item may be a single letter, digit or other symbol or could be a longer code (such as the serial number A123456 shown in FIG. 5), consisting of multiple individual aperture arrays which can be encoded individually or collectively (though not all of the arrays making up the code need to be themselves encoded). The data 32 to be encoded into the observable data item 30 is also obtained and again this can be done in numerous ways as will be described below. In this example, the encoded data item 32 is the numerical sequence “08765”, but in other implementations, text or graphical data could be used.

The observable data item 30 corresponds to an aperture array template in which the positions of the apertures relative to one another are selected so as to form the desired data item, here the letter “A”. In this example, the letter A is formed of 14 apertures although any suitable scheme could be used. A processor 40 then selects the shape of each aperture in the template according to predefined rules based on the data item 32 to be encoded. The result is an encoded aperture template 35 which includes the same number and positional relationship between the apertures as in the original aperture template, but the shape of at least some of the apertures has been selected to reflect the encoded data item.

The encoding technique applied by processor 40 can take many different forms. In a first example, where the number of possible encoded data items 32 is finite, the processor 40 could be linked to a database such as database 41 of which an extract is illustrated in FIG. 7. The database 41 associates each possible encoded data item 32 with a corresponding sequence of shapes. For example, here the data item “08765” is shown to correspond to the shape sequence “circle, circle, circle, circle, square, star, circle, circle, circle, circle”, and it will be seen that this corresponds to the first ten apertures o f the encoded aperture template 35 (counting from the top line of the letter “A”, starting at the left and ending at the right-most circle of the letter’s horizontal crossbar). A sequence of ten shapes has been selected in this example since each of the letters A to Z and digits 0 to 9 is formed of a minimum of ten apertures using the present aperture template scheme. However, any other number of shapes could be used to encode the data as desired. If the aperture template for the particular observable data item includes more apertures than are used in the encoded shape series, the remaining apertures in the template could be set to a default shape or could be allocated shapes at random in order to further increase the difficulty of decoding the data for a potential counterfeiter. The database 41 linking the data items to the corresponding shape series would be made available to authorisation systems used to validate the documents, in order to decode the arrangement of apertures.

In an alternative embodiment, the processor 40 could be provided with a predefined algorithm which is used to directly encode the data 32 into the aperture template. An example of this using a base-2 system (where only two aperture shapes are available) is depicted in FIG. 8. Again, the observable data item is the letter “A”, and the aperture template comprises 14 spaced apertures 30*a* to 30*n*, as depicted on the left hand side of FIG. 8. The data to be encoded, here the number “08765”, corresponds to the binary code “10001000111101”. Each of the aperture positions 30*a* to 30*n* is taken to represent one of the binary positions, and the shape of each aperture is then selected as high (square, “1”) or low (circle, “0”) as necessary. For example, in FIG. 8, aperture 30*a* is taken to represent the highest binary positions, and aperture 30*n* the lowest. Therefore, the actual value represented by each bit depends, in this example, on not only the shape of the aperture but also on its location within the array. For example, in a binary system, the lowest binary position (here corresponding to aperture 30*n*) may represent units of 1, and the next-lowest binary position (aperture 30I) units of 2, such that a “high” bit level in position 30*n* corresponds to a bit value of 1, but a “high” bit level in position 30I corresponds to a bit value of 2. Other systems such as decimal could alternatively be used. In other examples the bit-value could be disassociated from the location of the shaped aperture (e.g. if the aperture chosen to carry the data is randomly selected, in which case the bit value indicated by the displayed bit-level could be determined solely from the shape/orientation, although a large number of available bit-levels may be necessary).

Similar systems can of course be employed with any number of shapes as previously mentioned. Since the number of available bits will vary according to the original aperture template (and hence the nature of the observable data item), it may be desirable to limit the number of bits utilised to the number of apertures available in the most sparsely populated aperture template of the selected scheme. Alternatively, where a plurality of security elements are provided, each being capable of holding encoded data, the encoded data item could be encoded into a plurality of the arrays, either by making use the increased number of apertures now available to attain the necessary data capacity, or by splitting the encoded data item into two or more parts. For example, in the present case, “087” could be encoded into a first array, and “65” into a second.

The nature of the encoded data itself can be varied. However, in order that the encoded data can be verified (and hence used to confirm the authenticity of the document) it is preferred that the encoded data item is linked in some way with data which is retrievable from the security document (unless the same encoded data item is to be embedded into each document of the same sort). In preferred examples, the observable data item provides this function. That is, the encoded data item is associated with the observable data item. In the case of a single aperture array such as that depicted in FIG. 8, the encoded data item would be derived from the letter “A”, which is the observable data item. Alternatively, where multiple aperture arrays are provided in order to form a more complex visible code, such as a serial number, all or a part of this code (whether formed of encoded aperture arrays or not) can be used as the basis for the encoded data. For example, referring to the perforated serial number shown in FIG. 5, here the observable code is “A123456”. The encoded data represented by the assortment of shapes from which the perforated number is made is preferably based on this serial number.

The association between the serial number and the encoded data can take a number of forms. In one example, the serial number may be linked to a corresponding encoded data item via a database such as 51 shown in FIG. 9. Here the encoded data items can be randomly allocated to each serial number or could represent data otherwise linked to the serial number, such as the passport holder’s identity. When the authenticity of a document is to be checked, the encoded data retrieved from the assortment of shapes in the perforated feature can be compared with the serial number read visually from the document and checked against one another by reference to the database 51. To further enhance security, the database 51 could additionally specify a shape algorithm via which the encoded data item is to be input into the aperture template (in the process of FIG. 6). For example, algorithm 1 could correspond to a base-2 bit representation, algorithm to a base-3 bit representation and algorithm 3 to a base-4 bit representation.

In other implementations, the use of a database can be avoided by linking the serial number and encoded data by the use of a pre-programmed data generation algorithm. One particular example of this will be provided below. Depending on the parameters of the algorithm, the so-generated encoded data can represent validation data against which the reading of the serial number can be checked. In other words, the encoded data acts as a check digit for the serial number and it is therefore possible to do away with any separate check digit such as item 6 shown in FIG. 1*b*. For example, the encoded data may represent a number which, together with the observable letters and numbers in the serial number, satisfy a mathematical formula or equation. A common equation used for this purpose in the art is the so-called "IBM check" which is used in the sequence of digits which makes up a credit card number. The algorithm runs as follows: the digits in even positions, numbering from the right, are multiplied by two; any digits now greater than nine are reduced to a single digit by subtracting nine (equivalent to adding the two digits of the multi digit number) and finally all digits in the sequence are summed and a check digit defined which makes the result evenly divisible by 10. This check digit can be stored as the encoded data. Other possible check digit schemes also include the modulo 11 scheme used in the International Standard Book Number (ISBN) or the Electron Funds Transfer (EFT) routing number check which performs a modulo 10 operation on a weighted sum of the digits in a sequence. Further examples of check digits are described in patent application WO2008/007064.

By linking the encoded data to the observable data item, the security element is internally checkable without reference to any other data source. However, in addition or as an alternative, the encoded data item could be linked to other information provided in the document. FIG. 10 shows an exemplary document of value 100, here an open passport booklet, having the security element 25 already described with reference to FIG. 5. In addition, the passport 100 includes an RFID tag 90 and various printed information including a portrait of the holder 92 and a machine readable zone 93, which includes bibliographic information relating to the holder. Information from the RFID tag 90 or the printed information 92/93 could be used as the basis for the encoded data in element 25. For example, each RFID tag 90 typically includes an ID number which is not rewritable. This chip ID could be used as the encoded data hidden in element 25 by virtue of the assortment of shapes. In this case, the data items need not be linked by a database, since the authentication system can be equipped with a suitable reader for retrieving the information from the RFID tag 90 which could then be compared with the encoded data from element 25. Alternatively, to increase the security of the system, the readable chip ID could be used to look up other information from a database such as 61 shown in FIG. 11 in order to arrive at the encoded data. For example, the database could correlate chip IDs to corresponding shape sequences in much the same way as already described with reference to FIG. 7. Alternatively the chip IDs could be correlated to algorithms (as in FIG. 9) or shape algorithm parameters as shown in FIG. 11, both of which provide instructions as to how to arrive at the encoded data from a known starting point, such as the serial number or other observable data item taken from the element 25 itself. For example, where the encoded data is a check digit based on the visible serial number, the database 61 could store parameters of the check digit equation.

FIG. 12 schematically shows exemplary apparatus for manufacturing a security element as described above and, additionally, apparatus for authenticating a document of value to which such a security element has been applied. The apparatus for manufacturing the security element is designated generally as 70, whereas the authentication system is designated generally as 80.

In this example, the manufacturing apparatus comprises a laser 71 and a controller 72 which is programmed to operate the laser 71 to perforate a document 100 in accordance with the principles described above. Where the encoded data is to be generated and encoded in accordance with a pre-defined algorithm, this may simply be pre-programmed into the controller 72. However, in other examples, the controller 72 may be linked to a database 73 for retrieving the appropriate encoding rules and/or encoded data item for the document 100. If the encoded data is to be associated with other data stored on the document (e.g. in a machine readable element), the manufacturing apparatus 70 may also include a suitable reading device or retrieving data from the document, and/or a writing device for applying the data to the document in the desired format.

The authentication system 80 comprises an imaging device 81 such as a camera or scan head which is used to image the document 100 at least in the region of the perforated security element. An image processor 82 is programmed with shape recognition software for recognising the various shapes of the apertures making up the security element. If the encoded data is linked to the observable data, the image processor 82 is preferably also configured to recognise the observable data item from the relative positions of the apertures. Techniques for both of these processes are well known in the art. The authentication system also includes a processor 83 for verifying whether the encoded data is correct and hence whether the document 100 is genuine. The manner in which this is performed will depend on the nature of the encoded data and any relationship between other data on the document 100. For example, where the encoded data is linked to the observable data via a pre-determined algorithm, the processor 83 may simply be programmed with the same algorithm to enable the encoded data to be decrypted and compared with the visible code read from the positions of the apertures. Where the relationship between the encrypted data and the visible data is more complex, the processor 83 may be in communication with a database 85 which holds the necessary information. The database 85 may be linked to the database 73 of the manufacturing system 70 (for example, via the Internet 75) to ensure that the information is regularly updated.

Where the encrypted data is additionally or alternatively linked to other information provided on the document of value 100, depending on the nature of the machine readable element in which the information is stored, a further reader 84 may be provided in the authentication apparatus to retrieve the relevant data from the document 100. For example, where the data is held in a RFID tag, the reader 84 may comprise a RFID tag reader adapted to interrogate the RFID tag. Other forms of reader may be provided as necessary.

A particular example of the manufacture of a security element in accordance with the presently disclosed techniques and a corresponding authentication method will now be described with reference to the flowcharts of FIGS. 13 and 14.

FIG. 13 shows steps involved in manufacturing a security element. In this example, the encoded data item is based on upon the perforated serial number (i.e. the observable data item) and is generated by applying a predefined algorithm to the serial number. In step S100, the observable data item, such as the serial number to be applied to the document, is obtained. This may be retrieved from a list of available numbers, an order specification, or from the document itself, for example. Here, the serial number is the code "A123456". In step S102, any letters included in the serial number are converted to their ASCII equivalents. Here, the letter "A" is converted into the number "65", so the serial number becomes "65123456". In step S104, the so-obtained serial number is subtracted from a secret number, such as "9987534634". The secret number could be particular to a certain document issuer or even particular to the serial number itself (in which case a database linking serial numbers to corresponding secret numbers would be required). The result is a new code, "9922411178". Of course, in other examples, far more complex functions could be applied to obtain such a code.

In step S106, the generated code is used as the encoded data item. A corresponding series of shapes is obtained by applying a predefined algorithm or any other suitable method, such as those described with reference to FIGS. 6, 7 and 8. The aperture template corresponding to the original serial number can then be updated with the desired aperture shapes and finally, in step S108, the document is perforated with apertures of the appropriate shapes. The resulting security element visibly conveys the serial number "A123456" with the code "9922411178" embedded within.

FIG. 14 depicts steps involved in determining whether the same document is authentic. In step S200, the perforated element is imaged to retrieve the observable serial number and to recognise the shapes and positions of each individual aperture. In step S202, the shape encoding algorithm applied in step S106 is reversed in order to convert the recognised arrangement of shapes into the encoded data item. In the present example, this should result in the code "9922411178".

In step S204, the retrieved encoded data item is subtracted from the same secret number as used in step S104, to give a result of "65123456".

Finally, in step S206, the result is compared with the retrieved serial number, converting any letters in the retrieved serial number to their ASCII equivalent. If the two are found to match, the authenticity of the document is verified.

As mentioned at the outset, instead of (or as well as) utilising different aperture shapes to encode data into the aperture array, the orientation of the individual apertures within the array may be controlled to carry the encoded data. The method of encoding data into the array is the same as described above except that, rather than select different aperture shapes, different orientations of the apertures relative to the document surface are chosen. All of the apertures within the array could be configured to have the same shape, which may be desirable to reduce the visual impact of the encoded data. FIG. 15 illustrates a further embodiment of a security element 130 formed in this way. Here, the observable data item is an outline of a house, depicted using an array of star-shaped apertures 130*a*, 130*b*, etc. The majority of the apertures forming the array 130 are orientated such that the uppermost point of the star points in the direction parallel to a reference feature 135 of the document. For example, the apertures labelled 130*a* and 130*b* are orientated in this way. The feature 135 may be an edge of the document, or could be provided on the document in any other desired way such as printing or as an aperture itself. Alternatively, rather than provide a separate orientation feature 135, the observable data item itself can be used to act as such a reference. For example, in the house outline of FIG. 15, the verticals forming the "door" of the house each define a direction (which in this example happens to be parallel to reference line 135), and the orientation of each individual aperture 130 can be measured relative to this direction.

To encode data into the element 130, the orientation of each of the apertures (or a selection thereof) forming the array is selected using a process analogous to that described above in respect of the previous embodiments. In this example, all of the apertures are arranged in the "upright" position with the exception of apertures 130*x*, 130*y* and 130*z*, each of which have been rotated by a small angle, as will be seen from the Figure. This alternative orientation represents a second bit-level in the same way that a selection of an alternative shape was used to represent data in the previous embodiments.

Clearly, the number of distinguishable orientations which can be achieved using any one aperture shape will depend on its geometry and, in particular, on its level of symmetry. Due to the reasonably high level of symmetry of the five-pointed star, it may be deemed that only the two alternative orientations depicted in FIG. 15 are sufficiently distinguishable for use in encoding data. However, the data capacity can be increased by selecting a shape of lesser symmetry, such as the letter "R" shown in FIG. 16. This shows four examples of apertures formed in the shape of the letter R, aperture 140*a* in the usual "upright" orientation and apertures 140*b*, c and d showing the same shape reflected about the vertical and horizontal axes. Of course, the letter could also be rotated about an axis normal to the surface of the document to produce an even greater number of alternative orientations, which are readily distinguishable from one another.

The level of data storage can be even further enhanced by utilizing different aperture orientations in combination with different aperture shapes in the same security element, with both the shapes and the orientations acting as differentiators between bit-levels.

The invention claimed is:

1. A security element for a document of value, the security element comprising an array of apertures through at least a portion of the document of value, the arrangement of apertures relative to one another forming an observable data item comprising at least one letter or numerical digit, wherein at least two of the apertures in the array and forming part of the at least one letter or numerical digit by virtue of their positions are of different shapes or orientations from one another, the occurrence of the different shapes or orientations within the array representing an encoded data item, wherein the encoded data item is derived from the observable data item.

2. A security element according to claim 1, wherein the encoded data item is represented by at least one of the apertures designated as a multi-level bit, the shape and/or orientation of the designated aperture representing its bit-level.

3. A security element according to claim 1, wherein the encoded data item is represented by at least one of the apertures designated as a multi-level bit, the shape and/or orientation of the designated aperture in combination with the location of the designated aperture within the array representing its bit-value.

4. A security element according to claim 1, wherein the encoded data item comprises at least one bit of data, each of the at least one bit being represented by a selected aperture within the array, and each bit having a value selected from at least two bit-values, represented by the shape, orientation and/or location of each of the at least one selected aperture.

5. A security element according to claim 4, wherein the encoded data item comprises a plurality of bits of data, each bit being represented by a separate selected aperture within the array.

6. A security element according to claim 1, comprising multiple arrays of apertures, each of the arrays of apertures forming a discrete observable data item and each including an encoded data item represented by the occurrence of different shapes and/or orientations of apertures within the array.

7. A security element according to claim 1, wherein the encoded data item comprises verification data enabling verification of the observable data item.

8. A security element assembly, comprising a security element according to claim 1 and a machine readable element, both the security element and the machine readable element being arranged on a document of value, the machine readable element having stored therein validation data against which the encoded data item can be checked.

9. A security element assembly according to claim 8, wherein the machine readable element comprises a RFID chip, a barcode, a two-dimensional barcode, a digital watermark or an optical character recognition code.

10. A security element assembly according to claim 8, wherein the validation data comprises the encoded data item.

11. A document of value comprising a security element according to claim 1.

12. A document of value according to claim 11, wherein the document of value is a passport, identification card, licence, banknote, cheque or certificate.

13. An authentication system for checking the authenticity of a document of value according to claim 11, the system comprising:

an image capture device adapted to obtain an image of at least a portion of the security element;

an image processor adapted to identify the shape and/or orientation of at least one selected aperture in the image;

an authentication processor adapted to determine whether the identified shape(s) and/or orientation(s) meet predetermined authentication criteria, wherein the image processor or a further reader is adapted to read the observable data item of the security element or other information provided on the document, and the authentication processor is adapted to determine whether the identified shape(s) and/or orientation(s) meet predetermined authentication criteria based on the observable data item, by determining whether the identified shape (s) and/or orientations are derived from the observable data item.

14. An authentication system according to claim 13, wherein the authentication processor is adapted to determine whether the identified shape(s) and/or orientations meet predetermined authentication criteria by determining whether the relationship between the observable data item read from the security element and the identified shape(s) and/or orientation(s) conforms to a predefined algorithm.

15. An authentication system according to claim 13, adapted for checking the authenticity of a document of value comprising a security element assembly, comprising a security element including an array of apertures through at least a portion of the document of value, the arrangement of apertures relative to one another forming an observable data item, wherein the array of apertures comprises apertures of at least two different shapes or orientations, the occurrence of the different shapes or orientations within the array representing an encoded data item, and a machine readable element, both the security element and the machine readable element being arranged on the document of value, the machine readable element having stored therein validation data against which the encoded data item can be checked, the system further comprising a device for reading the machine readable element of the security element assembly and wherein the authentication processor is adapted to determine whether the identified shape(s) or orientation(s) meet predetermined authentication criteria based on the validation data stored in the machine readable element.

16. A security element according to claim 1, wherein the observable data item is a serial number.

17. A method of manufacturing a security element on a document of value, comprising:

obtaining a first data item and generating an aperture array template, the apertures in the array template being arranged such that the first data item is observable from the arrangement of apertures, the first data item comprising at least one letter or numerical digit;

obtaining a second data item and encoding the second data item within the aperture array template by assigning one of at least two different shapes and/or orientations to at least one of the apertures in the array template according to a predefined algorithm, whereby at least two of the apertures in the encoded aperture array template and forming part of the at least one letter or numerical digit by virtue of their positions are of different shapes or orientations from one another, the occurrence of the different shapes or orientations representing the second data item; and perforating at least a portion of the security document according to the encoded aperture array template, wherein the encoded data item is derived from the observable data item or from other information provided on the security document.

18. A method according to claim 17, further comprising designating at least one of the apertures in the aperture array template as a multi-level bit and assigning each of the at least one designated aperture a shape and/or orientation representing a bit-level in accordance with the second data item.

19. A method according to claim 18, wherein the assigned shape and/or orientation of each of the at least one designated aperture in combination with its location within the array represents a bit-value in accordance with the second data item.

20. A method according to claim 17, wherein the second data item comprises at least one bit of data, and the step of assigning one of at least two different shapes and/or orientations to each of the apertures in the array template comprises selecting an aperture within the aperture array template to represent each of the at least one bit of data, and assigning a shape and/or orientation, based on the bit-value of the respective bit of data, to each of the at least one selected aperture.

21. A method according to claim 17, wherein obtaining the second data item comprises performing an algorithm on the first data item to generate the second data item.

22. A method of manufacturing a security element assembly on a document of value, comprising:

manufacturing a security element in accordance with claim 17;

providing a machine readable element on the document of value; and storing, in the machine readable element, validation data against which the encoded data item can be checked.

23. A method according to claim 22, wherein the machine readable element comprises a RFID chip, a barcode, a two-dimensional barcode, a digital watermark or an optical character recognition code.

24. A method according to claim 22, wherein the validation data comprises the second data item.

25. A method according to claim 17, wherein the observable data item is a serial number.

* * * * *